Nov. 27, 1923. 1,475,601
M. SCHLING
HAND SEED SOWER
Filed June 2, 1923
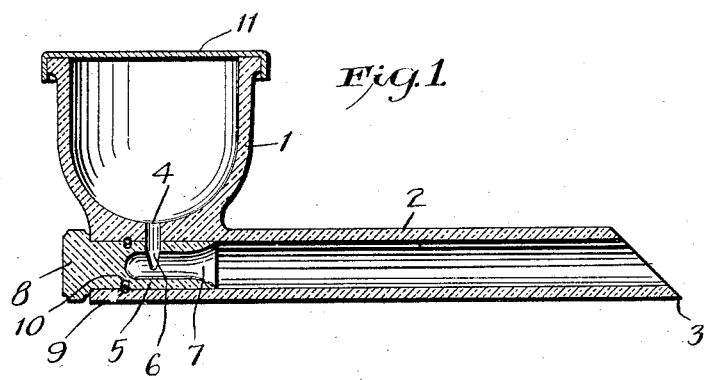
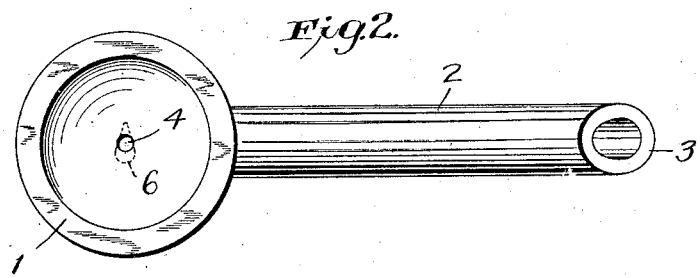
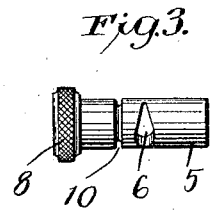

Patented Nov. 27, 1923.

1,475,601

UNITED STATES PATENT OFFICE.

MAX SCHLING, OF NEW YORK, N. Y.

HAND SEED SOWER.

Application filed June 2, 1923. Serial No. 642,945.

*To all whom it may concern:*

Be it known that I, MAX SCHLING, a citizen of the United States, residing at New York city, in the county of New York and State of New York, have invented new and useful Improvements in Hand Seed Sowers, of which the following is a specification.

The invention is an improvement upon and within the hand seed-sower disclosed in my prior application Serial No. 576,430, filed July 21, 1922. These seed-sowers are especially adapted for sowing the finer flower seeds broadcast, with such certainty in spacing as to insure proper room for the development of the individual plants, prior to replanting. The sower, as disclosed in that application, is an integral device, not unlike a smoker's pipe in appearance, adapted to be held in the hand, and comprising a bowl to hold the seeds and a laterally projecting hollow stem forming a sowing tube, together with means for controlling the flow of seeds from the stem to the bowl in a manner appropriate to the different sizes of seeds and the rate of delivery desired.

The present improvement is characterized by a construction involving a hollow plug in the rear end of the stem, by which the passage of seeds is varied or cut off.

In the accompanying drawings forming a part hereof:

Fig. 1 is a vertical longitudinal section;

Fig. 2 is a plan view; and

Fig. 3 is a side view of the plug.

The device comprises a bowl 1 and a hollow stem 2, preferably of one piece of transparent material. The lower part of the extremity of the stem is continued beyond the upper part to form a lip 3.

In the bottom of the bowl is a small opening 4, preferably circular; and in the rear part of the bore of the stem, which is extended clear through to the rear end, is a hollow plug 5, having in its side a seed-opening 6 positioned to cooperate with the opening 4.

The hollow interior 7 of the plug receives the seeds through the opening 6 and is open at the front to the unoccupied bore of the stem, of which the chamber 7 forms a continuation passage. The back end of the plug is closed, and is formed with a knurled projecting head 8, by which the plug can be turned, both the plug and the bore in which it fits frictionally being cylindrical for the purpose. The plug is advantageously held in place by a split-spring ring 9, which can be compressed entirely into a groove 10 in the plug and which when the plug is fully inserted expands part way out into a complementary groove in the body, thereby locking the plug against any endwise movement which would interfere with the intended coaction of the openings 4 and 6.

The opening 6 is elongated and tapered transversely of the plug, being relatively broad at one end and coming to a point at the other. By appropriately turning the plug, therefore, either the small or the broad end of the opening 6 can be brought under the opening 4, or any intermediate graduation can be secured. The plug can also be turned so that the openings are entirely out of communication, and the seed then retained in the bowl can be confined against loss by a slip or snap cover 11.

In the use of the device, the plug is turned to secure the desired degree of passage opening from the bowl to the stem, and the bowl is filled with seeds. Then, by gently tapping the bowl 2 with one hand, while it is held in the other hand, a fine stream of seed will be created along the bore of the stem and caused to issue from the terminal 3 and fall precisely where and in the spacing intended upon the ground, the seed being delivered either singly or in any small quantity desired.

What is claimed as new is:

1. A pipe-like hand seed-sower of the kind described, comprising a bowl having an opening in the bottom, a hollow stem projecting from the bowl forming a sowing tube, and a hollow plug in the rear end of said stem having in its side a seed opening to cooperate with the opening in the bottom of the bowl and its hollow interior open to the interior of the stem.

2. A pipe-like hand seed-sower of the kind described, comprising a bowl having an opening in the bottom, a hollow stem projecting from the bowl forming a sowing tube, and a hollow cylindrical plug mounted rotatably in the rear end of said stem, said plug having a seed opening in its side opening into its hollow interior which is open at the front to the interior of the stem, and the rear end of the plug being closed and provided with an external head for turning.

MAX SCHLING.